United States Patent
Nishikawa

(10) Patent No.: US 9,393,871 B2
(45) Date of Patent: Jul. 19, 2016

(54) POWER CONVERSION DEVICE

(75) Inventor: Katsuya Nishikawa, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 120 days.

(21) Appl. No.: 14/364,653

(22) PCT Filed: Dec. 12, 2011

(86) PCT No.: PCT/JP2011/078694
§ 371 (c)(1),
(2), (4) Date: Jun. 11, 2014

(87) PCT Pub. No.: WO2013/088496
PCT Pub. Date: Jun. 20, 2013

(65) Prior Publication Data
US 2014/0343778 A1    Nov. 20, 2014

(51) Int. Cl.
*H02M 7/00* (2006.01)
*B60L 1/00* (2006.01)
(Continued)

(52) U.S. Cl.
CPC . *B60L 1/003* (2013.01); *B60L 1/16* (2013.01); *B60L 9/18* (2013.01); *B60L 15/007* (2013.01); *H02M 1/12* (2013.01); *H02M 7/00* (2013.01);
(Continued)

(58) Field of Classification Search
CPC ............. B60L 1/003; B60L 1/16; B60L 9/18; B60L 15/007; B60L 2210/30; B60L 2200/26; H02M 1/12; H02M 7/04; H02M 7/217; H02M 2001/008; H02M 2001/0012; H02M 2001/0038; H02M 7/487; H02M 7/00
See application file for complete search history.

(56) References Cited

U.S. PATENT DOCUMENTS 5,642,020 A * 6/1997 Miyazaki ................ B60L 9/005
290/40 D

FOREIGN PATENT DOCUMENTS

| JP | 62-210804 A | 9/1987 |
|---|---|---|
| JP | 4-12602 A | 1/1992 |

(Continued)

OTHER PUBLICATIONS

International Search Report (PCT/ISA/210) mailed on Jan. 10, 2012, by the Japanese Patent Office as the International Searching Authority for International Application No. PCT/JP2011/078694.
(Continued)

*Primary Examiner* — Tuan C. To
*Assistant Examiner* — Genna Mott
(74) *Attorney, Agent, or Firm* — Buchanan Ingersoll & Rooney PC

(57) ABSTRACT

A propulsion control device is connected to each converter as a load. A carrier phase table, in which, when load states of propulsion control devices capable of being determined to be equivalent to each other are grouped in a same group, setting values of phase angles in the same group are given for each group, is provided in a phase-angle determination unit providing a desired phase angle between signal wave and carrier wave. The phase-angle determination unit refers to the carrier phase table based on a load state signal indicating a load state of each propulsion control device and an own-vehicle ID signal, determines a phase angle provided to each converter, and outputs it to a PWM control unit. The PWM control unit changes a phase angle of the carrier wave based on the phase angle determined by the phase-angle determination unit.

10 Claims, 7 Drawing Sheets

(51) Int. Cl.
  *H02M 7/217* (2006.01)
  *B60L 1/16* (2006.01)
  *B60L 9/18* (2006.01)
  *B60L 15/00* (2006.01)
  *H02M 1/12* (2006.01)
  *H02M 7/04* (2006.01)
  *H02M 7/487* (2007.01)
  *H02M 1/00* (2006.01)

(52) U.S. Cl.
  CPC ............. *H02M 7/04* (2013.01); *H02M 7/217* (2013.01); *B60L 2200/26* (2013.01); *B60L 2210/30* (2013.01); *H02M 7/487* (2013.01); *H02M 2001/008* (2013.01); *H02M 2001/0012* (2013.01); *H02M 2001/0038* (2013.01); *Y02T 10/645* (2013.01)

(56) References Cited

FOREIGN PATENT DOCUMENTS

| | | |
|---|---|---|
| JP | 7-274517 A | 10/1995 |
| JP | 8-98317 A | 4/1996 |
| JP | 2008-136265 A | 6/2008 |
| JP | 2010-130788 A | 6/2010 |
| JP | 2010-130850 A | 6/2010 |
| WO | WO 98/43848 A1 | 10/1998 |

OTHER PUBLICATIONS

Written Opinion (PCT/ISA/237) mailed on Jan. 10, 2012, by the Japanese Patent Office as the International Searching Authority for International Application No. PCT/JP2011/078694.

* cited by examiner

POWER CONVERSION DEVICE

FIELD

The present invention relates to a power conversion device mounted on an electric vehicle.

BACKGROUND

As a conventional technique, for example, according to Patent Literature 1 mentioned below, in a plurality of power conversion devices that are connected in parallel to an AC power supply and are operated, a phase angle that minimizes harmonics leaked to the side of the AC power supply is set in each of the power conversion devices, and a carrier waveform is generated while considering the phase angle using a zero point of a sinusoidal wave of a power supply voltage as a reference.

Further, according to the Patent Literature 1, all of the power conversion devices in a consist are handle as equivalent devices, and when phase differences are given to the carrier wave to suppress harmonics, the angles thereof are set at equal intervals.

CITATION LIST

Patent Literature

Patent Literature 1: Japanese Patent Application Laid-open No. H7-274517

SUMMARY

Technical Problem

The method described in Patent Literature 1 mentioned above is effective when respective power conversion devices always input and output the same current at the same time. However, when the respective power conversion devices are operated, all of these devices do not necessarily always input and output the same current at the same time. When the operating states of propulsion control devices that control main motors are different from each other, differences occur in the operating timing and an input/output current among the power conversion devices that cause harmonics. As a result, there is a problem with the occurrence of residual harmonic components that cannot be cancelled out.

In the case of a configuration in which auxiliary power supply devices in the same consist are not connected to all the power conversion devices, that is, in the case of a configuration where a power conversion device whose load is a propulsion control device and an auxiliary power supply device and a power conversion device whose load is only a propulsion control device are present in a mixed manner in the consist, for example, during coasting where propulsion control devices are not operated, only part of the power conversion devices, that is, only power conversion devices having the auxiliary power supply devices connected thereto are operated. Therefore, differences occur in the operation timing and an input/output current among the power conversion devices, and there is a problem with the occurrence of residual harmonic components that cannot be cancelled out.

The present invention has been achieved in view of the above problems, and an object of the present invention is to provide a power conversion device that can effectively suppress harmonics even when the operating states of propulsion control devices are different from each other, and even when a power conversion device whose load is a propulsion control device and an auxiliary power supply device and a power conversion device whose load is only a propulsion control device are present in a mixed manner in a consist.

Solution to Problem

In order to solve the above problems and achieve the object, a power conversion device according to the present invention is a power conversion device that is mounted on at least two vehicles of a plurality of connected vehicles that constitute a train consist and that includes a converter that converts an AC voltage into a DC voltage, a PWM control unit that generates a PWM signal executing PWM control on a switching element included in the converter on a basis of a carrier wave and a signal wave and outputs the PWM signal, and a phase-angle determination unit that provides a desired phase angle between the signal wave and the carrier wave, wherein a propulsion control device that executes propulsion control of an electric vehicle by using DC power supplied from each of the converters is connected to each of the converters as a load, a first table, in which, when load states of propulsion control devices that are capable of being determined to be equivalent to each other are grouped in a same group, setting values of phase angles in the same group are given for each group, is provided in the phase-angle determination unit, the phase-angle determination unit refers to the first table on a basis of a first signal indicating a load state of each of the propulsion control devices, determines a phase angle provided to each of the converters, and outputs the phase angle to the PWM control unit, and the PWM control unit sets or changes a phase angle of the carrier wave on a basis of the phase angle determined by the phase-angle determination unit.

Advantageous Effects of Invention

According to the present invention, an effect is obtained where a suppressing effect of harmonics can be increased.

DESCRIPTION OF EMBODIMENTS

A power conversion device according to embodiments of the present invention will be explained below with reference to the accompanying drawings. The present invention is not limited to the embodiments described below.

First Embodiment.

Figure 1:
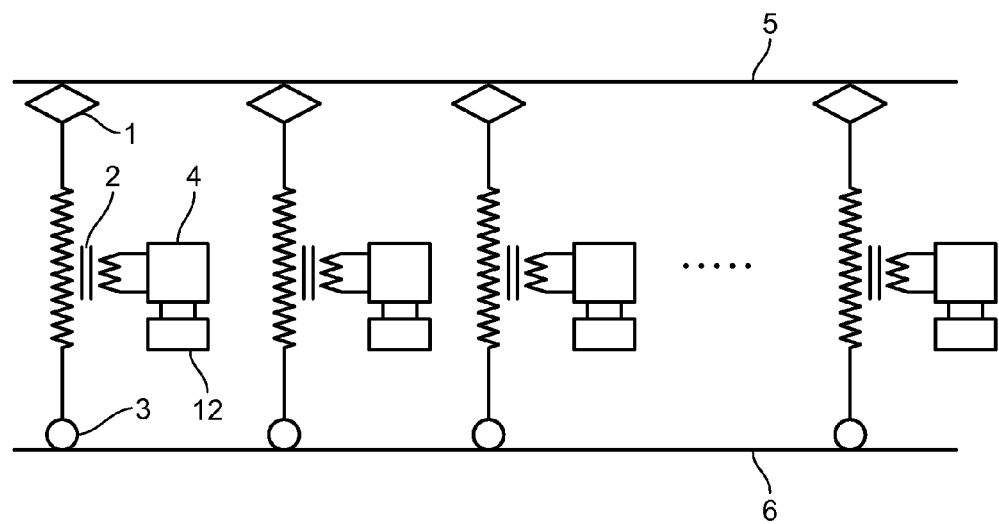
FIG. 1 is a diagram of an example of an overall configuration of a train consist on which power conversion devices according to a first embodiment are mounted.

FIG. 1 is a diagram of an example of an overall configuration of a train consist on which power conversion devices according to a first embodiment of the present invention are mounted. As shown in FIG. 1, the train consist on which the power conversion devices according to the first embodiment are mounted is constituted by including a pantograph 1, a transformer 2, wheels 3, a power conversion device 4, and a load device group 12 in each vehicle, and a plurality of the power conversion devices 4 are provided in one train consist. The pantograph 1, the transformer 2, and the wheels 3 of each vehicle are connected in series between an overhead wire 5, which is an electric power supply source (a power supply), and a rail 6. The power conversion devices 4 convert AC power supplied from the transformers 2 into DC power and supply the converted DC power to the load device groups 12.

Figure 2:
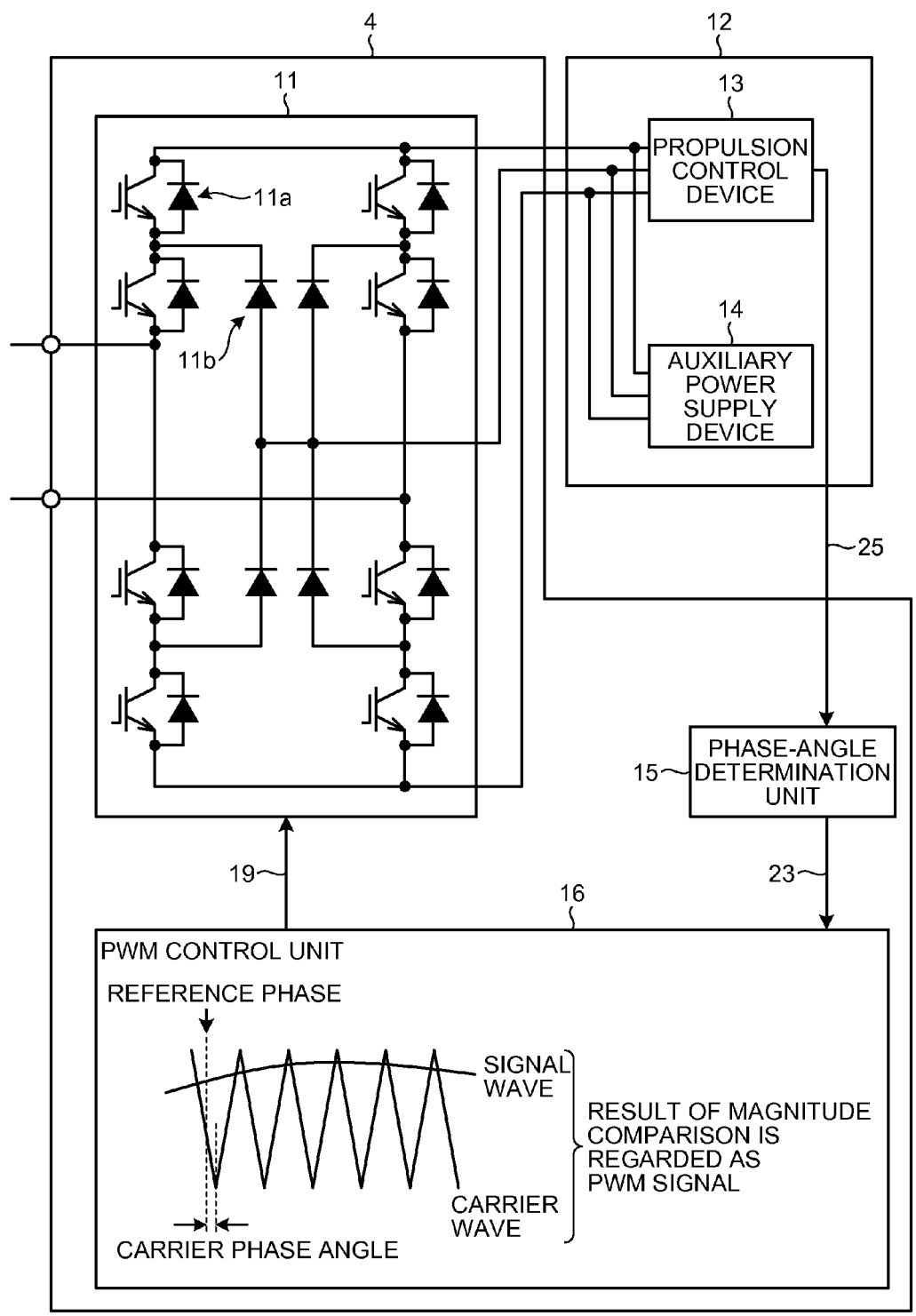
FIG. 2 is a diagram of a configuration example of the power conversion device according to the first embodiment.

FIG. 2 is a diagram of a configuration example of the power conversion device according to the first embodiment. The power conversion device 4 includes a converter 11, a phase-angle determination unit 15, and a PWM control unit 16. The converter 11 is a power converter that converts an input AC voltage into a DC voltage, includes a plurality of switching elements 11a and a plurality of diodes 11b, and is constituted as a known three-level converter. While a three-level converter is exemplified in FIG. 2, configurations other than a three-level converter (for example, a two-level converter) can be also employed.

The load device group 12 is a constituent element that collectively refers to a propulsion control device 13 and an auxiliary power supply device 14. The propulsion control device 13 is a device used for propulsion control of an electric vehicle, and generates a drive force by a power converter (an inverter) and a main motor (both not shown) to drive the electric vehicle. The auxiliary power supply device 14 is a power supply device that supplies power to devices other than the main motor, and supplies required power to a braking device, an illuminating device, a door opening/closing device, an air conditioning device, and the like (all not shown).

The phase-angle determination unit 15 is a constituent element that determines a carrier phase angle provided to the PWM control unit 16. The phase-angle determination unit 15 generates a phase-angle setting signal 23 including information on the carrier phase angle on the basis of a load state signal 25, which indicates a load state of the propulsion control device 13 and serves as a first signal, and outputs the phase-angle setting signal 23 to the PWM control unit 16. The PWM control unit 16 is a constituent element that generates a PWM signal for controlling the switching elements 11a included in the converter 11, and generates a PWM signal 19 on the basis of a signal wave and a carrier wave and outputs the PWM signal 19 to the converter 11.

Figure 3:
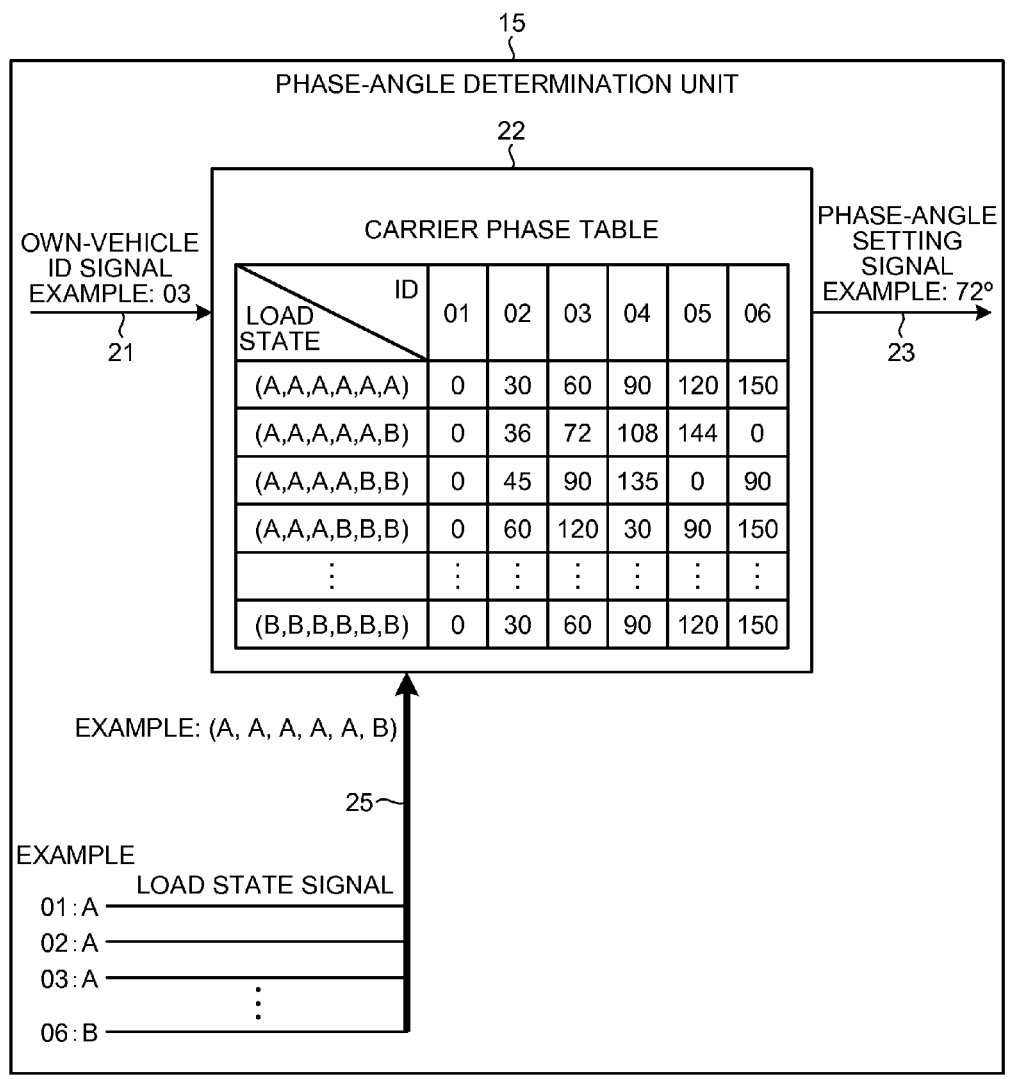
FIG. 3 is a diagram explaining an operation of a phase-angle determination unit according to the first embodiment.

FIG. 3 is an explanatory diagram for explaining an operation of the phase-angle determination unit 15 shown in FIG. 2. The phase-angle determination unit 15 includes a carrier phase table 22 that is referenced as a first table. An own-vehicle ID signal 21 and the load state signal 25 are input to the phase-angle determination unit 15. The own-vehicle ID signal 21 includes identification information (ID) for identifying a vehicle on which the power conversion device 4 is mounted among vehicles constituting a train consist. This ID can be a car number or an identification number represented by ordering vehicles on which the power conversion devices 4 are mounted in ascending order from "01". When the ID is a car number, the ID is not necessarily a serial number as shown in FIG. 3. For example, when the power conversion device is mounted on 2nd, 5th, 8th, and 11th cars of a 12-car train, IDs thereof are "02", "05", "08", and "11", respectively, from the left.

Meanwhile, the load state indicated in the row header of the carrier phase table 22 is information where information included in the load state signal 25 output from the propulsion control device 13 is arranged from the left for each ID. For example, the load state (A, A, A, A, A, B) on the second row indicates a case where the load state of the propulsion control device mounted on the vehicle of the ID 06 is "B" and the load states of other propulsion control devices (propulsion control devices mounted on the vehicles of the IDs 01 to 05) are "A". In this case, the load state is an index for representing a concept that equivalent load states are managed as a group. That is, the load states "A" are a group of the load states that can be determined to be equivalent to each other. The load states "B" are a group of the load states that can be determined to be different from the load state "A". While FIG. 3 is an example of a case where the load states are divided into two groups, that is, the load state "A" and the load state "B", it is needless to mention that the load states can be divided into three or more groups.

Next, the phase angle set in the carrier phase table 22 is explained. The phase angle set in the carrier phase table 22 is a carrier phase angle indicated in the PWM control unit 16 shown in FIG. 2. This carrier phase angle is, for example, a phase angle at which the PWM control unit 16 can generate a carrier wave obtained by shifting a vertex of a carrier wave from a reference phase that is a predetermined phase of a signal wave by a carrier phase angle. The signal wave and the reference phase are common to the converters 11 mounted on the respective vehicles. Therefore, PWM signals generated by the converters 11 are signals whose phases are shifted from each other by the phase angles set in the table shown in FIG. 3.

For example, when the load states of the propulsion control devices 13 are (A, A, A, A, A, A) as shown on the first row in FIG. 3, the phase angles in the range of 0 to 150° are set for the power conversion devices (the converters) of the IDs 01 to 06 at 30° intervals, i.e., at equal intervals. These carrier phase angles are set in this manner in order to reduce harmonic components generated by the carrier wave. For example, the phase angle components at 30° intervals in the range of 0 to 150° are 0°, 30°, 60°, 90°, 120°, and 150°, and the sum of the vectors of the components 0°, 60°, 120°, 180°, 240°, and 300° obtained by doubling these phase angles is zero. Accordingly, second harmonics that are the most problematic among harmonics generated in the converters 11 can be effectively suppressed. In addition, even harmonic components other than second harmonics can be also effectively suppressed.

When the load states of the propulsion control devices 13 are (A, A, A, B, B, B) as shown on the fourth row in FIG. 3, 0°, 60°, 120°, 30°, 90°, and 150° are respectively set as the carrier phase angles for the IDs 01 to 06. Therefore, the phase angles in a first group grouped according to the load state A are 0°, 60°, and 120°, and the sum of the vectors of the components 0°, 120°, and 240° obtained by doubling these phase angles is zero. Similarly, the phase angles in a second group grouped according to the load state B are 30°, 90°, and 150°, and the sum of the vectors of the components 60°, 180°, and 300° obtained by doubling these phase angles is also zero. Accordingly, generation of harmonics can be suppressed for each of the groups grouped according to the load states A and B.

Next, an operation of the phase-angle determination unit 15 when the own-vehicle ID signal 21 and the load state signal 25 are input thereto is explained with reference FIG. 3. For example, when the own-vehicle ID signal 21 of the ID 03 is input from a higher-level control device, the phase-angle determination unit 15 recognizes that the ID of the own vehicle is 03. The ID signal can be always input or periodically input. Alternatively, it is also possible to configure such that the ID signal is input when a system is activated and not input when a train is running.

The phase-angle determination unit 15 recognizes, on the basis of the load state signal 25, that the load states of the propulsion control devices 13 are (A, A, A, A, A, B), refers to a value "72" on the second row and the third column of the carrier phase table 22 (the third column is a field of the ID "03"), causes the phase-angle setting signal 23 to include a reference value "72°", and outputs the signal to the PWM control unit 16. As explained above, this value is referenced in the PWM control unit 16 and a carrier wave having a phase difference of 72° from the reference phase is generated.

While the configuration in which one power conversion device is connected to a transformer has been explained in FIG. 1, a configuration in which a plurality of power conversion devices are connected to a transformer can be used. In the case of this configuration, if optimization is performed for each of the groups grouped according to the load state of a propulsion control device and optimization is performed for each of the power conversion devices connected to the same transformer, it is possible to suppress heat generation in the transformer and to contribute to an efficient operation of the transformer.

Furthermore, the configuration in which both the propulsion control device 13 and the auxiliary power supply device 14 are connected to the converter 11 is disclosed in FIG. 2. However, even when a vehicle having only the propulsion control device 13 connected to the converter 11 and a vehicle having both the propulsion control device 13 and the auxiliary power supply device 14 connected to the converter 11 are present in a mixed manner in vehicles on which the power conversion devices 4 are mounted, the control method according to the first embodiment is effective. In such a case, for example, it suffices that the carrier phase table 22 shown in FIG. 3 is held for a group of vehicles having only the propulsion control device 13 connected to the converter 11 and for a group of vehicles having both the propulsion control device 13 and the auxiliary power supply device 14 connected to the converter 11, and thus the effects explained in the present embodiment can be obtained.

As explained above, according to the power conversion device of the first embodiment, it is configured such that the load states of the propulsion control devices executing propulsion control of electric vehicles that can be determined to be equivalent to each other are grouped in the same group, a first table, in which setting values of the phase angles in the same group are given for each of groups, is provided, and each time a first signal indicating the load state of a propulsion control device is input or changed, a phase angle of a carrier wave used when a PWM signal is generated is set or changed to a phase angle given in the first table. Accordingly, even when the operating states of the propulsion control devices are different from each other and thus the load states of the power conversion devices are also different from each other, harmonic components generated in the power conversion devices can be effectively suppressed.

Second Embodiment.

Figure 4:
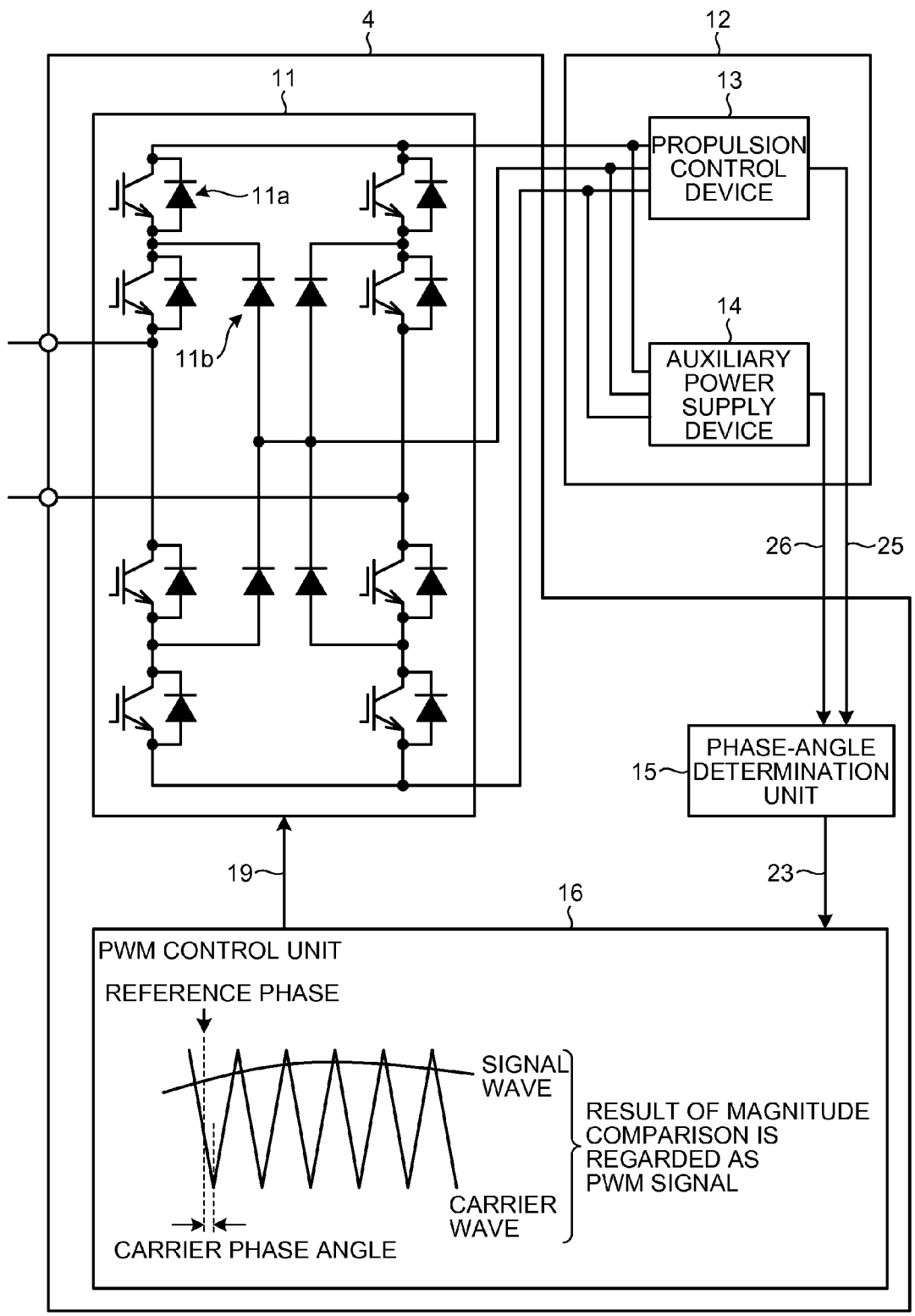
FIG. 4 is a diagram of a configuration example of a power conversion device according to a second embodiment.

FIG. 4 is a diagram of a configuration example of a power conversion device according to a second embodiment of the present invention. According to the power conversion device shown in FIG. 4, a configuration in which a load state signal 26 indicating the load state of the auxiliary power supply device 14 and serving as a second signal is input to the phase-angle determination unit 15 is added to the configuration of the power conversion device shown in FIG. 2. Other configurations are identical or equivalent to the configurations of the first embodiment, and thus common constituent elements are denoted by like reference signs and redundant explanations thereof will be omitted.

Figure 5:
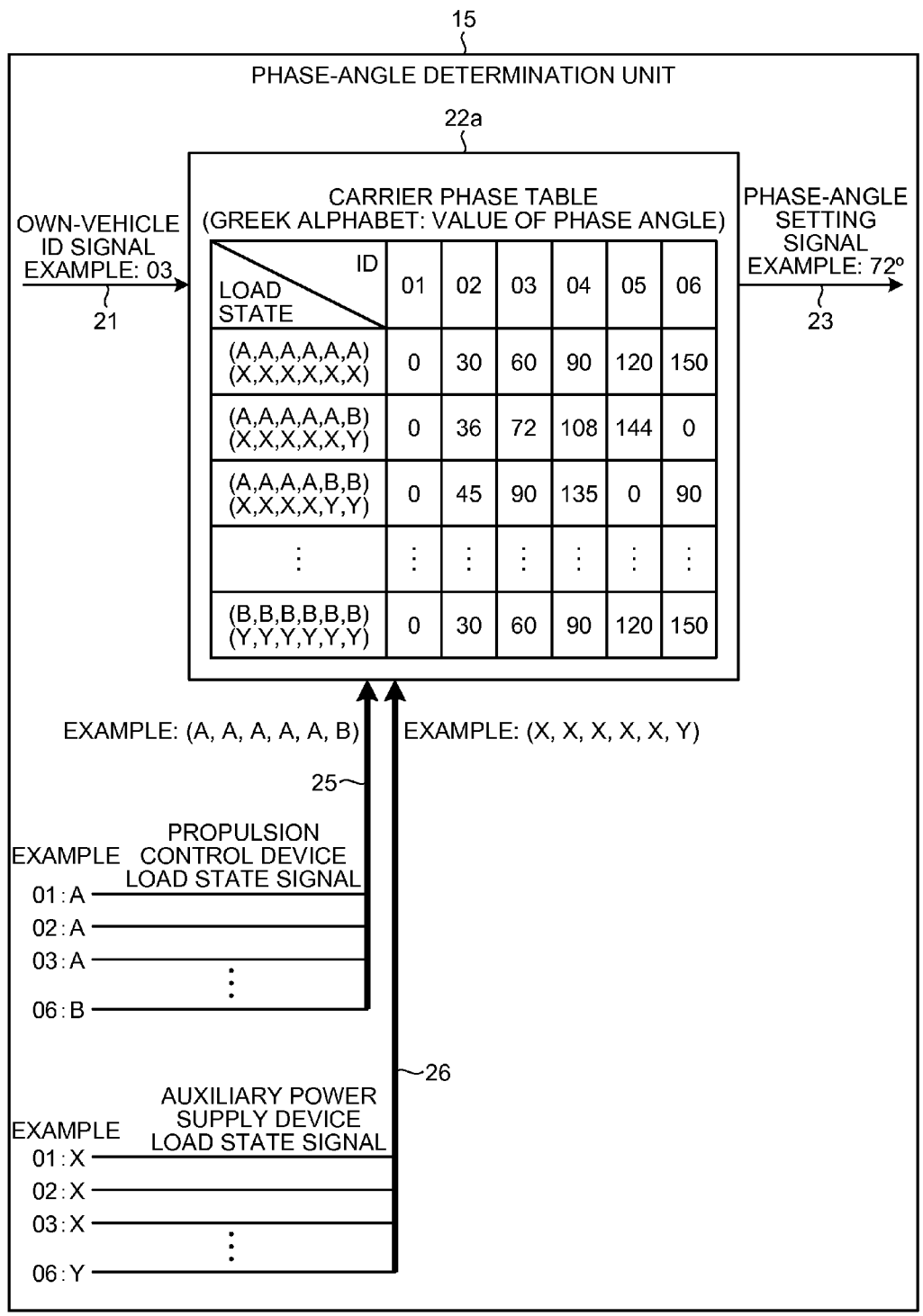
FIG. 5 is a diagram explaining an operation of a phase-angle determination unit according to the second embodiment.

FIG. 5 is an explanatory diagram for explaining an operation of the phase-angle determination unit 15 according to the second embodiment shown in FIG. 4. A carrier phase table 22a referenced as a second table is provided in the phase-angle determination unit 15. The own-vehicle ID signal 21 and the load state signals 25 and 26 are input to the phase-angle determination unit 15.

In the load state indicated in the row header of the carrier phase table 22a, information where information included in the load state signal 25 output from the propulsion control device 13 is arranged from the left for each ID and information where information included in the load state signal 26 output from the auxiliary power supply device 14 is arranged from the left for each ID are written together. For example, the load states (A, A, A, A, A, B), (X, X, X, X, X, Y) on the second row indicate a case where the load states of the propulsion control devices mounted on the vehicles of the IDs 01 to 05 are "A", the load state of the propulsion control device mounted on the vehicle of the ID 06 is "B", the load states of the auxiliary power supply devices mounted on the vehicles of the IDs 01 to 05 are "X", and the load state of the auxiliary power supply device mounted on the vehicle of the ID 06 is "Y". While FIG. 5 is an example of a case where the load states of the auxiliary power supply devices are divided into two groups, that is, the load state "X" and the load state "Y", it is needless to mention that the load states can be divided into three or more groups.

For example, it can be assumed that the load state explained above is a case where when (A, X) indicates a load state of a moderately air-conditioned vehicle and (B, Y) indicates a load state of a normally air-conditioned vehicle, A=1000 kW, B=950 kW, X=100 kW, and Y=150 kW. That is, this example is assumed to be a case where when the total output of a propulsion control device and an auxiliary power supply device is 1100 kW (=A+X=B+Y), 1000 kW is distributed to the propulsion control device and 100 kW is distributed to the auxiliary power supply device in the moderately air-conditioned vehicle, and 950 kW is distributed to the propulsion control device and 150 kW is distributed to the auxiliary power supply device in the normally air-conditioned vehicle.

Next, the phase angle set in the carrier phase table 22a is explained. For example, when the load states of the propulsion control devices 13 and the auxiliary power supply devices 14 are (A, A, A, A, A, A) and (X, X, X, X, X, X) as shown on the first row in FIG. 5, respectively, the phase angles in the range of 0 to 150° are set for the power conversion devices 4 (the converters 11) of the IDs 01 to 06 at 30° intervals, i.e., at equal intervals. These setting values are identical to those of the first row in FIG. 3. As explained above, even harmonic components including second harmonic components can be effectively suppressed.

Furthermore, when the load states of the propulsion control devices 13 and the auxiliary power supply device 14 are (A, A, A, A, B, B) and (X, X, X, X, Y, Y) as shown on the third row in FIG. 5, 0°, 45°, 90°, 135°, 0°, and 90° are respectively set as carrier phase angles for the IDs 01 to 06. Therefore, the phase angles in a first group grouped according to the load state pair (A, X) are 0°, 45°, 90°, and 135°, and the sum of the vectors of the components 0°, 90°, 180°, and 270° obtained by doubling these phase angles is zero, and thus harmonics in the group are suppressed. Similarly, the phase angles in a second group grouped according to the load state pair (B, Y) are 0° and 90°, and the sum of the vectors of the components 0° and 180° obtained by doubling these phase angles is also zero. Accordingly, generation of harmonics can be suppressed for each of the groups grouped according to the load state pairs (A, X) and (B, Y).

The configuration in which both the propulsion control device 13 and the auxiliary power supply device 14 are connected to the converter 11 is disclosed in FIG. 4. However, even when a vehicle having only the propulsion control device 13 connected to the converter 11 and a vehicle having both the propulsion control device 13 and the auxiliary power supply device 14 connected to the converter 11 are present in a mixed manner in vehicles on which the vehicle power conversion devices 4 are mounted, the control method according to the second embodiment is effective. For example, in FIG. 5, when the load state "Y" of the auxiliary power supply device 14 is defined as a case where the auxiliary power supply device 14 has malfunctioned, a case where the auxiliary power supply device 14 is in an operating state corresponding to the malfunction, or a case where the auxiliary power supply device 14 is not provided, a case where a vehicle that does not include the auxiliary power supply device 14 is present can be included. By such definitions, for example, a vehicle in which an auxiliary power supply device has malfunctioned and a propulsion control device is active and a vehicle that does not include an auxiliary power supply device can be managed in the same group.

As explained above, according to the power conversion device of the second embodiment, it is configured such that combinations of the load state of a propulsion control device executing propulsion control of an electric vehicle and the load state of an auxiliary power supply device that can be determined to be equivalent to each other are grouped in the same group, a second table, in which setting values of the phase angles in the same group are given for each of groups, is provided, and each time a first signal indicating the load state of a propulsion control device and a second signal indicating the load state of an auxiliary power supply device are input or changed, a phase angle of a carrier wave used when a PWM signal is generated is set or changed to a phase angle given in the second table. Accordingly, even when the operating states of the propulsion control devices and/or the auxiliary power supply devices are different from each other and thus the load states of the power conversion devices are also different from each other, harmonic components generated in the power conversion devices can be effectively suppressed.

Third Embodiment

Figure 6:
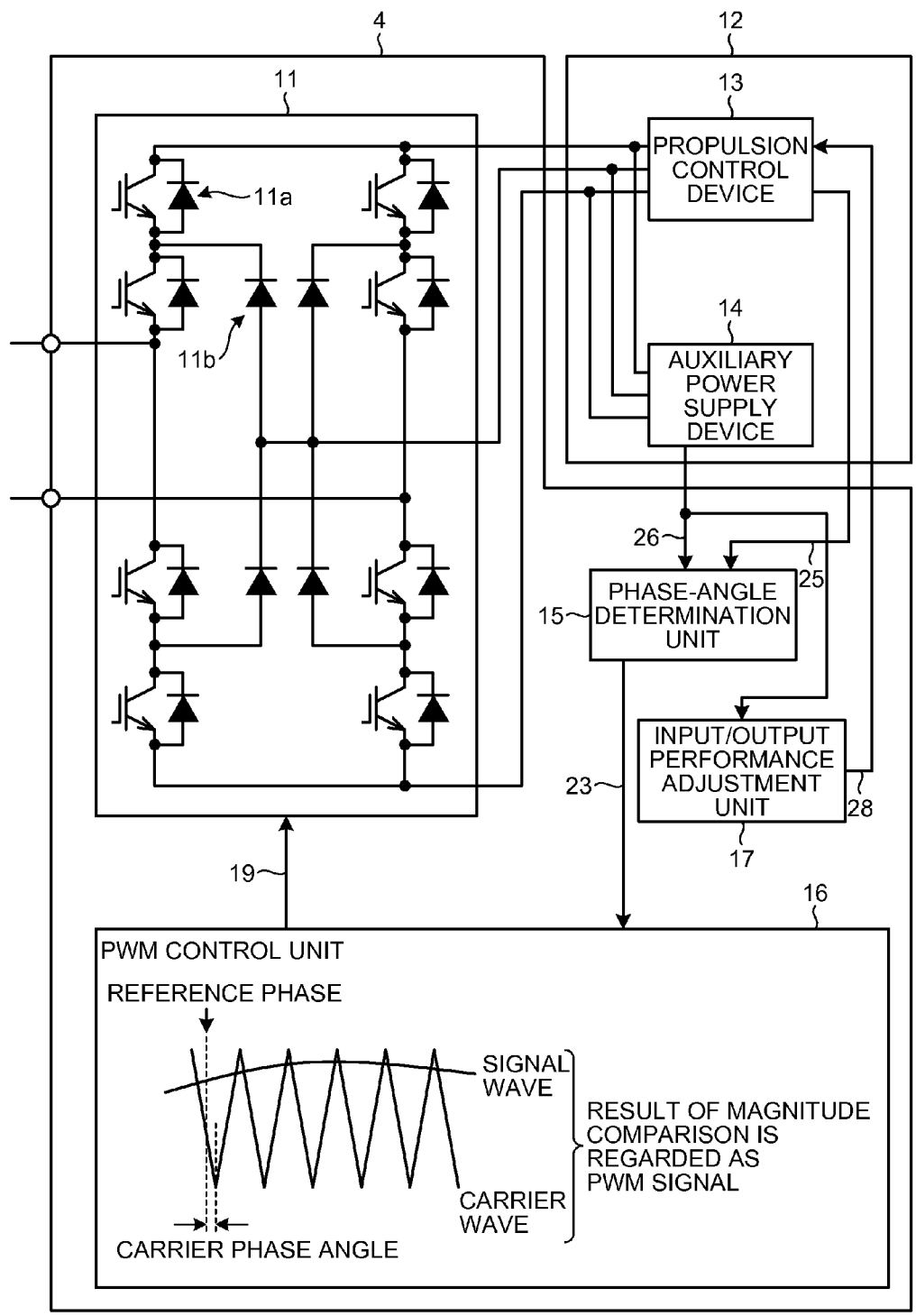
FIG. 6 is a diagram of a configuration example of a power conversion device according to a third embodiment.

FIG. 6 is a diagram of a configuration example of a power conversion device according to a third embodiment of the present invention. The power conversion device shown in FIG. 6 is different from the power conversion device shown in FIG. 4 in that an input/output performance adjustment unit 17, to which the load state signal 26 indicating the load state of the auxiliary power supply device 14 is input, which generates a performance command signal 28 as a third signal for adjusting an output of the propulsion control device 13, and which outputs the performance command signal 28 to the propulsion control device 13, is provided in the configuration of the power conversion device shown in FIG. 4. Other configurations are identical or equivalent to the configurations of the second embodiment, and thus common constituent elements are denoted by like reference signs and redundant explanations thereof will be omitted.

Figure 7:
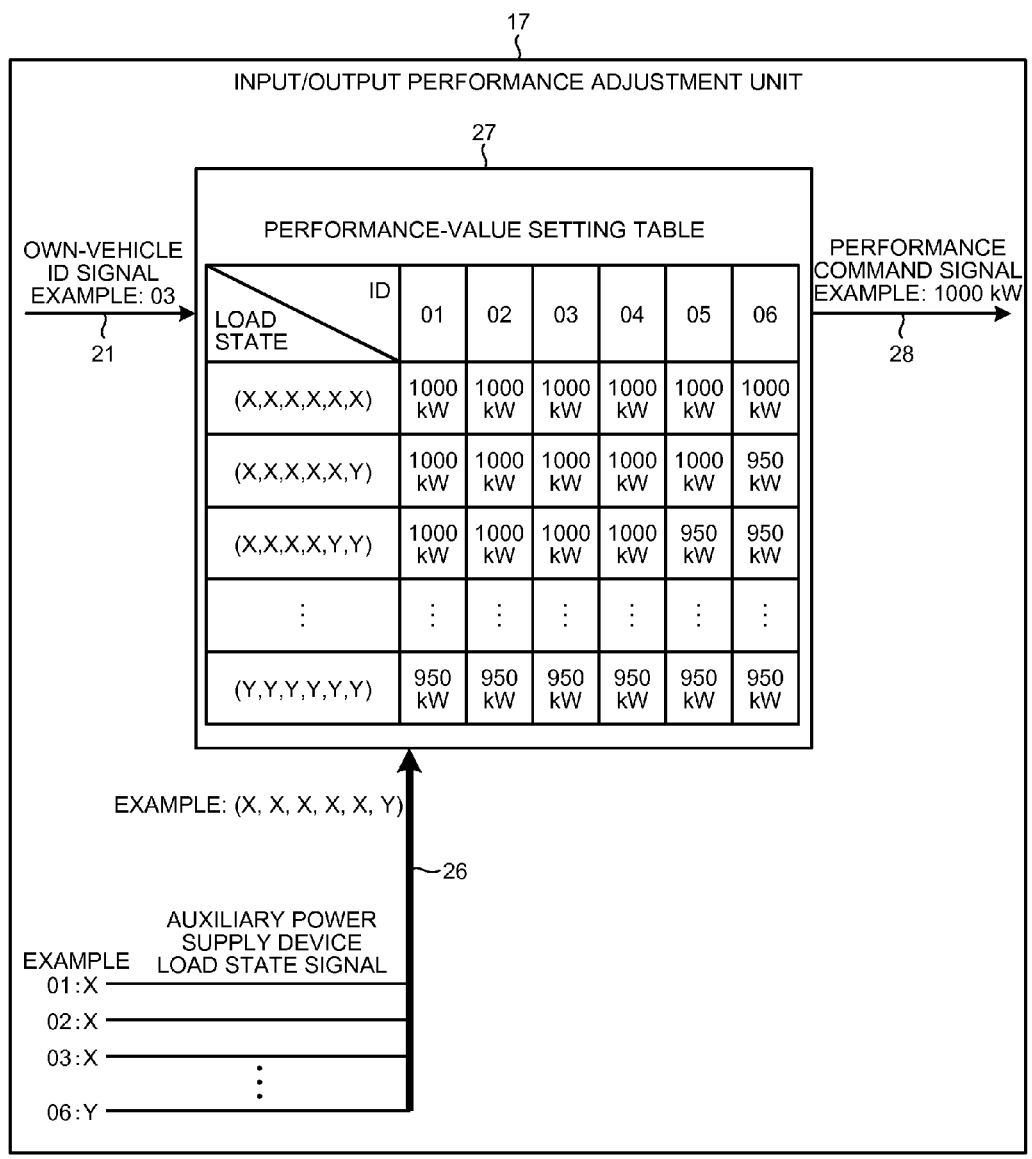
FIG. 7 is a diagram explaining an operation of an input/output performance adjustment unit according to the third embodiment.

FIG. 7 is an explanatory diagram for explaining an operation of the input/output performance adjustment unit 17 according to the third embodiment shown in FIG. 6. A performance-value setting table 27 referenced as a third table is provided in the input/output performance adjustment unit 17. The own-vehicle ID signal 21 and the load state signal 26 are input to the input/output performance adjustment unit 17.

In FIG. 7, the format of the performance-value setting table 27 is equivalent to that of the carrier phase table 22 shown in FIG. 3. However, while table values given in the carrier phase table 22 are phase angles of a carrier wave, table values given in the performance-value setting table 27 are performance values to be provided to the propulsion control devices 13.

Next, performance setting values set in the performance-value setting table 27 are explained. For example, when the load states of the auxiliary power supply devices 14 are (X, X, X, X, X, X) as shown on the first row in FIG. 7, 1000 kW that is the rated power of the propulsion control devices 13 is set in the power conversion devices 4 (the converters 11) of the IDs 01 to 06. When the load states of the auxiliary power supply devices 14 are (X, X, X, X, Y, Y) as shown on the third row in FIG. 7 (in this case, it is assumed that XY), for example, 1000 kW is set as a performance setting value of each of the propulsion control devices 13 of the IDs 01 to 04, and 950 kW is set as a performance setting value of each of the propulsion control devices 13 of the IDs 05 and 06.

As described above, because the power conversion device according to the present embodiment has a configuration in which the propulsion control device 13 and the auxiliary power supply device 14 are connected to the same converter 11, when the load state of the auxiliary power supply device 14 is high, it is preferable to control such that the output of the propulsion control device 13 is small. This is because when control of cancelling out harmonics using equivalent outputs of the converters 11 is executed, a preferable mode is to output propulsion control required for a train without excess and deficiency with this control. Therefore, according to the power conversion device of the present embodiment, the load states of the propulsion control devices 13 that can be determined to be equivalent to each other are grouped in the same group, and an identical performance value is set in the same group.

Next, an operation of the input/output performance adjustment unit 17 when the own-vehicle ID signal 21 and the load state signal 26 are input thereto is explained with reference FIG. 7. For example, when the own-vehicle ID signal 21 of the ID 03 is input from a higher-level control device, the input/output performance adjustment unit 17 recognizes that the ID of the own vehicle is 03. The ID signal can be always input or periodically input. Alternatively, it is also possible to configure such that the ID signal is input when a system is activated and not input when a train is running.

The input/output performance adjustment unit 17 recognizes, on the basis of the load state signal 26, that the load states of the auxiliary power supply devices 14 are (X, X, X, X, X, Y), refers to a value "1000" on the second row and the third column of the performance-value setting table 27, causes the performance command signal 28 to include a reference value "1000 kW", and outputs the signal to the propulsion control device 13. As explained above, this value is set in the propulsion control device 13 and the propulsion control device 13 is operated on the basis of this setting value.

While the third embodiment has described a case where a configuration of providing the input/output performance adjustment unit 17 is applied to the power conversion device according to the second embodiment shown in FIG. 4 as an example, the configuration of providing the input/output performance adjustment unit 17 can be also applied to the power conversion device according to the first embodiment shown in FIG. 2.

As explained above, according to the power conversion device of the third embodiment, it is configured such that the load states of the auxiliary power supply devices that can be determined to be equivalent to each other are grouped in the same group, a third table, in which the same setting value is given in the same group as a performance value provided to a propulsion control device and setting values that are different among groups are given, is provided, and each time a third signal indicating the load state of an auxiliary power supply device is input or changed, setting or changing to a performance value given in the third table is performed. Accordingly, the operating states of the auxiliary power supply devices are different from each other and thus the overall operating states of the power conversion devices are controlled appropriately, and harmonic components generated in the power conversion devices can be effectively suppressed.

The configurations described in the first to third embodiments are only examples of the configuration of the present invention, and it is obvious that the configurations can be combined with other publicly-known techniques and the configurations can be changed, for example, by omitting part thereof, without departing from the scope of the invention.

INDUSTRIAL APPLICABILITY

As described above, the present invention is useful as a power conversion device that can increase a suppressing effect of harmonics.

REFERENCE SIGNS LIST

1 Pantograph
2 Transformer
3 Wheel
4 Power conversion device
5 Overhead wire
6 Rail
11 Converter
11a Switching element
11b Diode
12 Load device group
13 Propulsion control device
14 Auxiliary power supply device
15 Phase-angle determination unit
16 PWM control unit
17 Input/output performance adjustment unit
19 PWM signal
21 Own-vehicle ID signal
22 Carrier phase table (first table)
22a Carrier phase table (second table)
23 Phase-angle setting signal
25 Load state signal (first signal)
26 Load state signal (second signal)
27 Performance-value setting table (third table)
28 Performance command signal (third signal)

The invention claimed is:

1. A power conversion device that is mounted on a vehicle of a plurality of connected vehicles that constitute a train consist, that includes a converter that converts an AC voltage into a DC voltage, a PWM control unit that generates a PWM signal executing PWM control on a switching element included in the converter on a basis of a carrier wave and a signal wave and outputs the PWM signal, and a phase-angle determiner that provides a desired phase angle between the signal wave and the carrier wave, wherein a propulsion control device that executes propulsion control of the vehicle by using DC power supplied from the converter, is connected as a load to converters in respective power conversion devices mounted in other vehicles of the plurality of connected vehicles, a first table is provided in the phase-angle determiner, in which propulsion control devices, which are respectively mounted in vehicles of the plurality of connected vehicles, are each grouped into one of a plurality of groups of different respective load states, and values of phase angles are set for each group, the phase-angle determiner identifies in the first table, based on a first signal indicating a load state of each of the propulsion control devices, a phase angle to be provided to the converter, and outputs the phase angle to the PWM control unit, and the PWM control unit sets or changes a phase angle of the carrier wave on a basis of the phase angle output by the phase-angle determiner.

2. The power conversion device according to claim 1, wherein a phase angle in a group that is set in the first table is set such that a sum of harmonics generated by the converters becomes minimum.

3. The power conversion device according to claim 1, wherein the train consist is constituted by including in a mixed manner a vehicle in which only the propulsion control device is connected to the converter and a vehicle in which both the propulsion control device and an auxiliary power supply device are connected to the converter.

4. A power conversion device that is mounted on a vehicle of a plurality of connected vehicles that constitute a train consist, that includes a converter that converts an AC voltage into a DC voltage, a PWM control unit that generates a PWM signal executing PWM control on a switching element included in the converter on a basis of a carrier wave and a signal wave and outputs the PWM signal, and a phase-angle determiner that provides a desired phase angle between the signal wave and the carrier wave, wherein a propulsion control device that executes propulsion control of the vehicle by using DC power supplied from the converter, and an auxiliary power supply device are connected as a load to each of the converters in respective power conversion devices mounted in other vehicles of the plurality of connected vehicles, a table is provided in the phase-angle determiner, in which, propulsion control devices and auxiliary power supply devices, which are respectively mounted in vehicles of the plurality of connected vehicles, are each grouped into one of a plurality of groups of different respective load states, and values of phase angles are set for each group, the phase-angle determiner identifies in the table based on a first signal indicating a load state of the propulsion control device and a second signal indicating a load state of the auxiliary power supply device, a phase angle to be provided to the converter, and outputs the phase angle to the PWM control unit, and the PWM control unit sets or changes a phase angle of the carrier wave on a basis of the phase angle output by the phase-angle determiner.

5. The power conversion device according to claim 4, wherein a phase angle in a common group that is set in a first table is set such that a sum of harmonics generated by the converters becomes minimum.

6. The power conversion device according to claim 4, wherein the train consist is constituted by including in a mixed manner a vehicle in which only the propulsion control device is connected to the converter and a vehicle in which both the propulsion control device and the auxiliary power supply device are connected to the converter.

7. The power conversion device according to claim 6, wherein when it is determined that the auxiliary power supply device has malfunctioned on the basis of the second signal, management is performed by the power conversion device such that a vehicle on which the malfunctioned auxiliary power supply device is mounted is managed as a vehicle on which only the propulsion control device is mounted.

8. The power conversion device according to claim 4, wherein load states of auxiliary power supply devices that are determined to be equivalent to each other are grouped in a same group; a second table is provided, in which performance values provided to the propulsion control device are the same in the same group and performance values that are different among groups are given; and each time a second signal indicating a load state of the auxiliary power supply device is input or changed, changing to the performance value given in the second table is performed.

9. The power conversion device according to claim 1, wherein load states of auxiliary power supply devices that are determined to be equivalent to each other are grouped in a same group; a second table is provided, in which performance values provided to the propulsion control device are the same in the same group and performance values that are different among groups are given; and each time a second signal indicating a load state of the auxiliary power supply device is input or changed, changing to the performance value given in the second table is performed.

10. The power conversion device according to claim 1, wherein the phase-angle determiner identifies in the first table, the phase angle to be provided to the converter based on a second signal indicating an identification of the vehicle of the plurality of connected vehicles that constitute the train consist.

* * * * *